United States Patent
Fells

(10) Patent No.: US 7,330,667 B2
(45) Date of Patent: Feb. 12, 2008

(54) ELECTRICAL COMPENSATION OF OPTICAL IMPAIRMENTS

(75) Inventor: Julian Fells, Epping (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 33 days.

(21) Appl. No.: 11/312,155

(22) Filed: Dec. 20, 2005

(65) Prior Publication Data

US 2007/0140703 A1    Jun. 21, 2007

(30) Foreign Application Priority Data

Dec. 23, 2004    (GB) ................................. 0428161.4

(51) Int. Cl.
*H04B 10/04* (2006.01)
*H04B 10/00* (2006.01)

(52) U.S. Cl. ............... 398/193; 398/192; 398/194; 398/195; 398/158

(58) Field of Classification Search ........ 398/192–195, 398/147, 158
See application file for complete search history.

(56) References Cited

U.S. PATENT DOCUMENTS

| | | | | |
|---|---|---|---|---|
| 5,850,305 | A * | 12/1998 | Pidgeon ..................... | 398/193 |
| 6,687,466 | B1 * | 2/2004 | Chiappetta ................. | 398/193 |
| 2001/0055137 | A1 * | 12/2001 | Kuri et al. ................. | 359/162 |
| 2004/0218932 | A1 * | 11/2004 | Epworth et al. ........... | 398/202 |
| 2006/0078336 | A1 * | 4/2006 | McNicol et al. ............ | 398/147 |

* cited by examiner

*Primary Examiner*—Dalzid Singh
(74) *Attorney, Agent, or Firm*—Barnes & Thornburg, LLP

(57) ABSTRACT

Optical impairments such as dispersion and fibre nonlinearity are compensated by generating a pre-distorted electrical signal at the transmitter. This signal is modulated onto a carrier signal, so that it is upconverted in frequency. This up converted signal is then used to modulate an optical source. Generally the optical signal will have two sidebands, one of which has the correctly pre-distorted information and the other which is unwanted. Information in the unwanted optical sideband is either filtered optically or electrically. In the preferred embodiments, the transmitter uses a tunable semiconductor laser with an integrated electroabsorption modulator to modulate the light. The preferred receiver is a coherent receiver with a tunable local oscillator laser. The receiver uses an electrical filter to remove the information in the unwanted sideband.

27 Claims, 10 Drawing Sheets

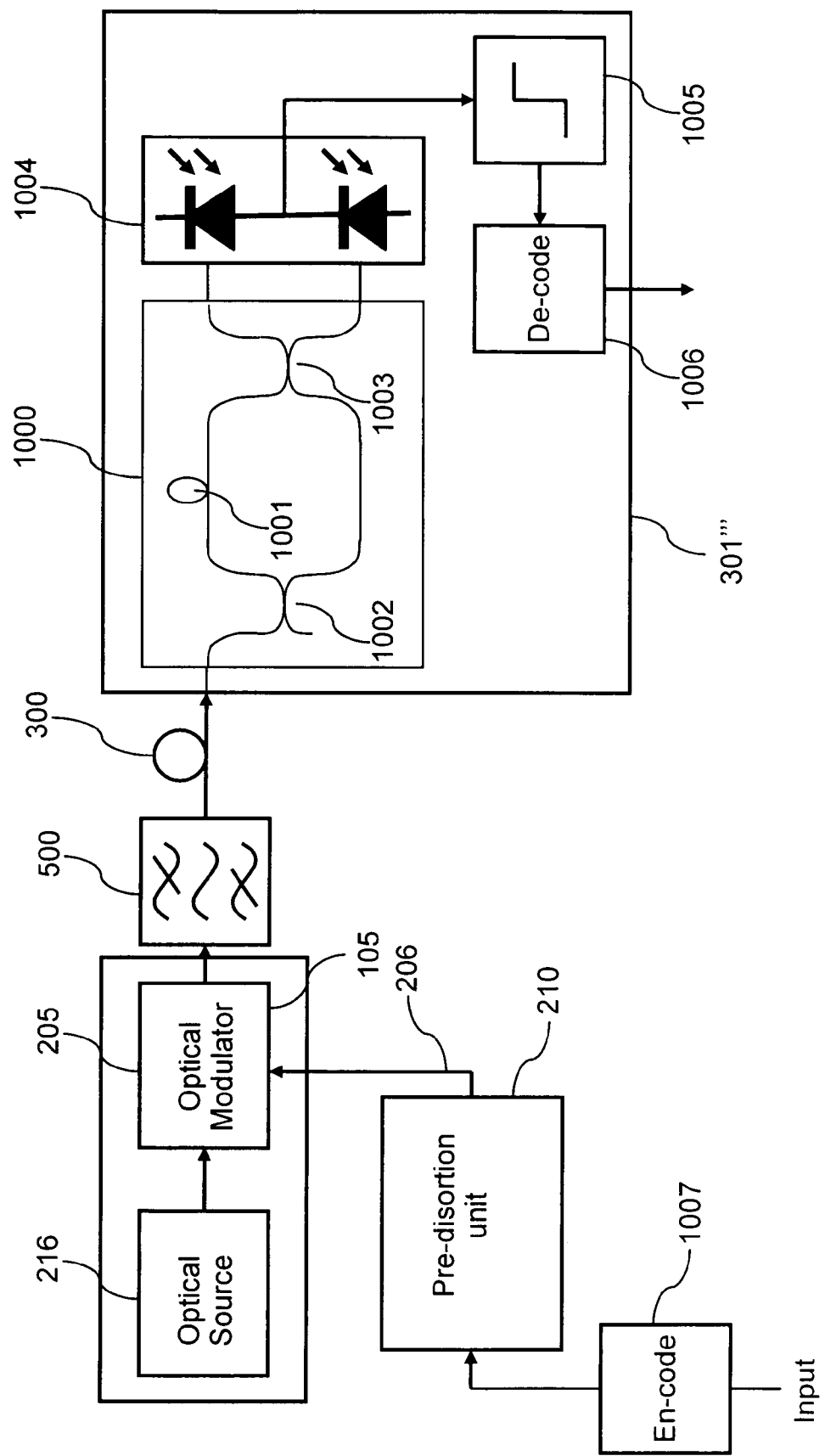

ELECTRICAL COMPENSATION OF OPTICAL IMPAIRMENTS

FIELD OF THE INVENTION

The present invention relates to a method and apparatus for compensating for optical impairments electrically and a system incorporating the same.

BACKGROUND TO THE INVENTION

Optical communications systems typically comprise of a transmitter which converts electrical signals into optical signals, an optical link over which the optical signals are transported and a receiver which converts the optical signal into an electrical signal, the electrical signal recovered at the receiver ideally being identical to the electrical signal originating at the transmitter. The optical link generally consists of optical transmission fibre to convey the signal and optical amplifiers to compensate for the loss that the fibre introduces. The optical amplifiers are generally interspersed at regular intervals along the link (e.g. every 40-200 km).

One impairment the optical fibre may exhibit is chromatic dispersion. This is where different optical frequencies of the light propagate at different speeds in the fibre. This results in the optical signal being distorted. Eventually after propagating over some distance of fibre, the signal will not be recoverable unless some compensation of this effect is afforded. For example, if a data rate of 10 GBit/s is used in an intensity modulation format at 1550 nm in standard fibre, then the signal will be irrecoverable after around 200 km without some form of compensation. Commercially deployed telecommunications systems use optical dispersion compensation devices to overcome this limitation. There are a number of optical dispersion compensation devices which fulfil this role, the preferred type being dispersion compensating fibre modules. These modules consist of optical fibre of a different type to the transmission fibre, known as dispersion compensating fibre. This fibre has dispersion which is of the opposite sign to the transmission fibre, such that when the dispersion compensating fibre is coupled to the transmission fibre, the overall net dispersion is within the limit of an uncompensated system. Typically the fibre has a higher magnitude of dispersion to the transmission fibre, to reduce the length required. The fibre is generally coiled and placed in modules. A number of modules may be used, distributed at the amplifier sites and terminal sites, or even lumped at one or a few sites.

However, there are a number of drawbacks to using dispersion compensating fibre modules for compensating for the optical dispersion. The most obvious disadvantage is that they tend to be very costly. However, they are also relatively large and have high optical loss. This latter feature results in more optical amplification being required which in turn increases cost and can have degrading effect on performance. A further disadvantage is that dispersion compensating fibre modules tend to be more sensitive to nonlinear distortion, thus also reducing performance. It is therefore desirable to reduce in number or eliminate completely the dispersion compensating devices to reduce the system cost and simultaneously increase the system performance.

One method for removing the optical dispersion compensation devices is disclosed in U.S. patent application Ser. No. 10/262,944, filed on Oct. 3, 2002 and published as US 2004/0067064 A1 on Apr. 8 2004. In this application, instead of compensating for the optical dispersion using an optical dispersion compensating device, the dispersion is compensated by electrical means. Such a method is illustrated in FIG. 1. In this example the electrical signal applied to the optical transmitter is first pre-distorted by applying a digital filter. The pre-distortion function is such that after the signal has passed through the system, it can be recovered at the optical receiver. One feature of this prior art is that to adequately compensate for the dispersion of the system it is necessary to have a pre-distorted signal which modulates both the amplitude and phase of the optical signal. That is the signal applied to the modulator is a complex signal, such that it contains both amplitude and phase information in a polar coordinate system or In-phase and Quadrature components in a Cartesian coordinate system. Accordingly, it is necessary to use an optical modulator which takes a complex signal as its input, a complex modulator. Such a modulator is considerably more expensive to fabricate than a conventional modulator, as the structure is larger and there are more processing steps involved in its fabrication. Additionally a significant expense is the amplifier used to provide sufficient voltage swing to drive the amplifier. Since two such amplifiers are required, this expense is increased. A disadvantage of using a complex modulator is that its optical loss is generally significantly higher than a conventional one. A further disadvantage is that the fabrication steps involved are very different from that of a semiconductor laser, such that it has not been possible to monolithically integrate a complex modulator with a semiconductor laser on the same substrate.

OBJECT TO THE INVENTION

The invention seeks to provide an improved method and apparatus for compensating optical impairments electrically using an optical modulator which does not require a complex input. The invention also seeks to provide an improved method and apparatus for compensating optical impairments electrically using an optical modulator of a design which may be monolithically integrated with a semiconductor laser.

SUMMARY OF THE INVENTION

According to a first aspect of the invention, there is provided a pre-distortion unit for compensating optical transmission impairments of a communications signal conveyed through an optical communications system comprising: at least one electrical filter for modifying an electrical input signal using a pre-distortion function to generate a pre-distorted electrical signal which mitigates the impairments in an optical system; and at least one upconverter for modulating the pre-distorted electrical signal onto an electrical carrier signal for modulation of an optical signal to generate a corresponding pre-distorted optical signal. This unit may be used to compensate for optical transmission impairments electrically, with the advantage that the pre-distorted signal has a single electrical output which may be applied to an optical modulator; the optical modulator not needing to be a complex optical modulator. It has the further advantage that it may be used with a low cost optical modulator such as an electrosborption modulator or a monolithically integrated laser electroabsorption modulator. It has the further advantage that it may be used with a directly modulated laser.

According to a second aspect of the invention, there is provided a system for compensating for optical transmission impairments on an optical signal conveyed through an optical communications system, the system comprising: at least one electrical filter for modifying an electrical input signal using a pre-distortion function to generate a pre-distorted electrical signal which mitigates the impairments in an optical system; and at least one upconverter for modulating the pre-distorted electrical signal onto an electrical carrier signal; and an optical transmitter for generating an optical signal and modulating said optical signal, using the upconverted pre-distorted electrical signal; and an optical receiver for converting the optical signal into an electrical signal. This unit is particularly advantageous as it may be used to compensate for optical transmission impairments electrically and does not need a complex optical modulator. It has the further advantage that it enables a low cost optical modulator such as an electrosborption modulator or an monolithically integrated laser electroabsorption modulator to be used. It has the further advantage that it enables a directly modulated laser to be used.

According to a third aspect of the invention, there is provided a method of compensating optical impairments of an optical signal conveyed through an optical communications system, the method comprising the steps of: filtering an electrical input signal using a pre-distortion function to generate a pre-distorted electrical signal which mitigates the impairments in an optical system; and modulating an RF carrier with a pre-disorted electrical signal to generate an upconverted pre-distorted electrical signal modulating an optical source using the upconverted pre-distorted electrical signal to generate a corresponding pre-distorted optical signal for transmission through the optical communications system. This method has the advantage that it may be used to compensate for optical transmission impairments electrically and does not need a complex optical modulator. It has the further advantage that it enables a low cost optical modulator such as an electrosborption modulator or a monolithically integrated laser electroabsorption modulator to be used. It has the further advantage that it enables a directly modulated laser to be used.

According to a fourth aspect of the invention, there is provided a pre-distorted optical signal suitable for being conveyed through a communications system, which has been filtered by a pre-distortion function which mitigates impairments in an optical system; and upconverted to an RF frequency; and upconverted to an optical frequency. This signal has the advantage that its generation does not need a complex optical modulator. It has the further advantage that it enables a low cost optical modulator such as an electrosborption modulator or an monolithically integrated laser electroabsorption modulator to be used. It has the further advantage that it enables a directly modulated laser to be used.

According to a fifth aspect of the invention, there is provided a pre-distortion unit in which the electrical filter is a digital filter, with the advantages that a more complicated pre-distortion function may be used and higher signal integrity may be maintained.

According to a sixth aspect of the invention there is provided a pre-distortion unit in which there are a plurality of electrical filters and a plurality of upconverters, each with different carrier frequencies and combined to form a composite signal. This arrangement has the advantage that multiple channels may be transmitted using a single modulator and thus the number of components and hence cost may be reduced.

According to a seventh aspect of the invention, there is provided a method in which the impairment is dispersion, with the advantage that dispersion compensating modules are not required and that the cost is reduced.

According to an eight aspect of the invention, there is provided a method in which the impairment is fibre-nonlinearity, with the advantage that the performance will be improved and as a result longer transmission distances will be possible.

According to a ninth aspect of the invention, there is provided a method in which the impairment is modulator chirp in addition to dispersion or fibre nonlinearity, with the advantage that a less ideal modulator may be used. If an electroabsorption modulator is used, a greater tolerance to chirp will mean that the wavelength window of operation will be increased.

According to a tenth aspect of the invention, there is provided a system in which the receiver comprises a local oscillator optical source for coherently interfering with the received signal. This has the advantage that the filtering of the unwanted signal components may be performed electrically, rather than optically.

According to an eleventh aspect of the invention, there us provided a system wherein the receiver has an interferometer for decoding a differential phase modulation format. This has the advantage that the performance will be improved and as a result longer transmission distances will be possible.

The invention is also directed to a method by which the described apparatus operates and including method steps for carrying out every function of the apparatus.

The invention also provides for a system for the purposes of communications which comprises one or more instances of apparatus embodying the present invention, together with other additional apparatus.

The invention also provides for computer software in a machine-readable form and arranged, in operation, to carry out every function of the apparatus and/or methods.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 10 shows a block diagram schematically illustrating the principle components and operations of a system for compensating for optical impairments electrically in accordance with a fifth embodiment of the present invention.

DETAILED DESCRIPTION OF INVENTION

Any range or device value given herein may be extended or altered without losing the effect sought, as will be apparent to the skilled person for an understanding of the teachings herein.

Figure 1:
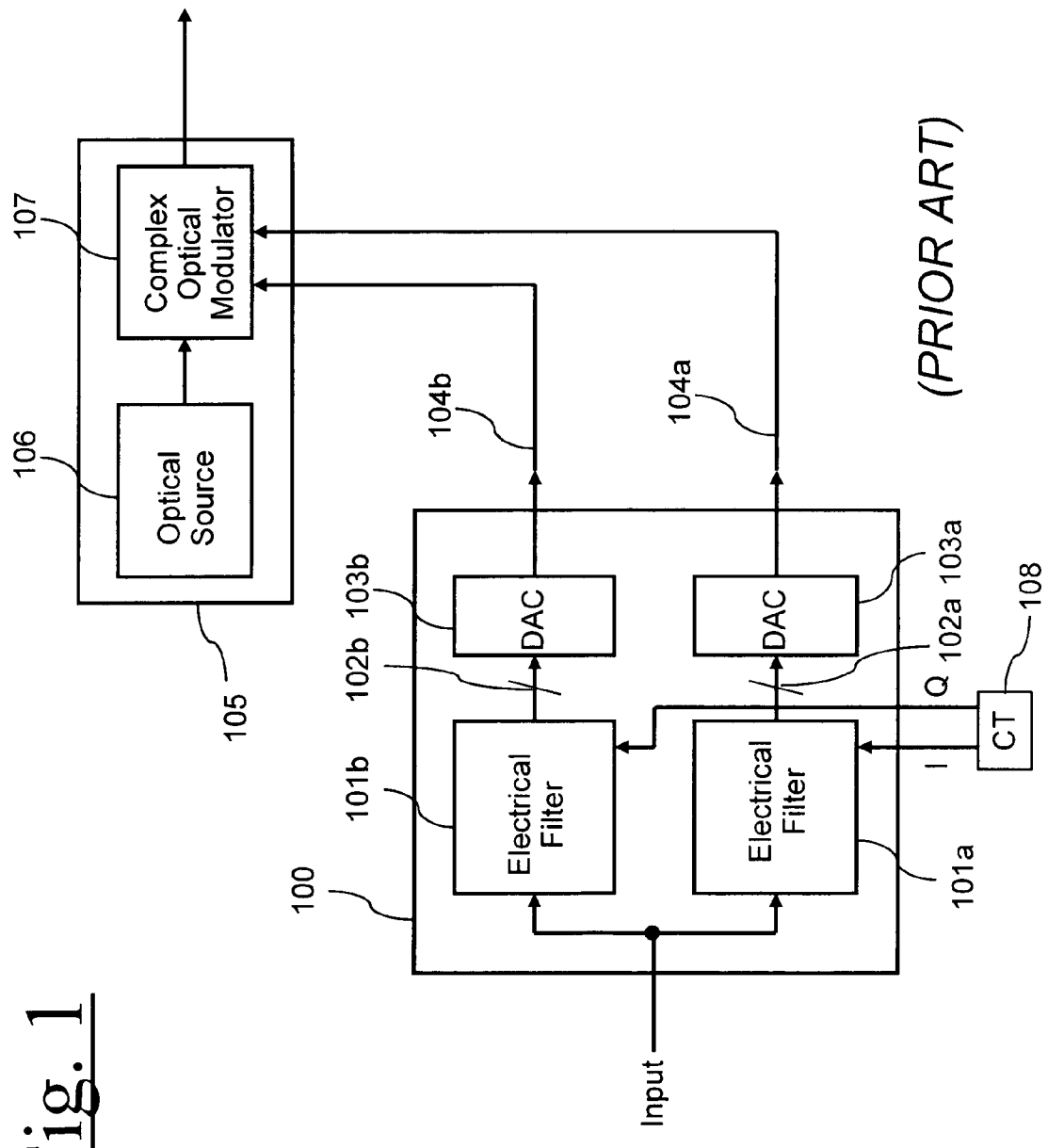
FIG. 1 shows a prior art system for compensating for optical impairments using an electrical pre-distortion of the original signal.
Figure 2:
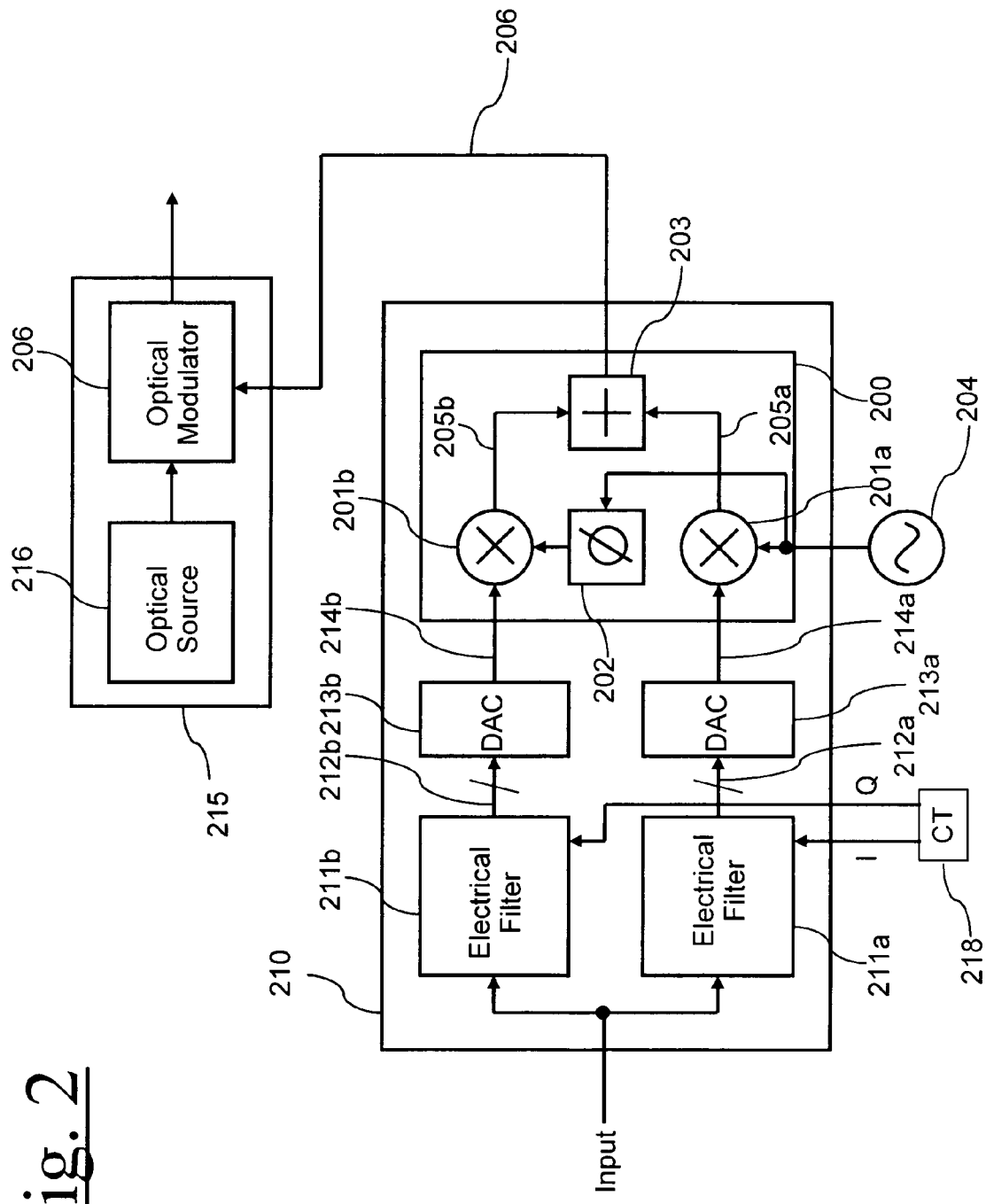
FIG. 2 shows a block diagram schematically illustrating the principle components and operations of a device for compensating for optical impairments electrically in accordance with a first embodiment of the present invention.

Referring firstly to FIG. 1 there is shown a prior art transmitter for compensating for the chromatic dispersion of a telecommunications system by using an electrical pre-distortion of the original signal. There is an optical transmitter 105 comprising an optical source 106 coupled to a complex optical modulator 107, which is capable of modulating the amplitude and phase of the optical signal in a Cartesian format by way of applying in-phase (I) 104a and quadrature (Q) 104b signal components. The information to be transmitted is coupled to an electrical pre-distortion unit 100, comprising two paths to generate the I component 104a and the Q component 104b of the pre-distorted signal. Each respective path comprises an electrical filter 101a and 101b, a serial to parallel converter 102a and 102b, and a digital-to analogue converter 103a and 103b. The electrical filters 101a and 101b respectively take as inputs the I and Q components of the required pre-distortion transfer function, generated by a processor 108 adapted to determine the correct coefficients for mitigation of the impairments FIG. 2 shows a schematic block diagram in accordance with the first embodiment of the present invention. Here there is an optical transmitter 215 comprising an optical source 216 (which may be a semiconductor laser and may be wavelength tunable) and an optical modulator 206. The optical modulator 206 is different from the complex optical modulator 217 in that it only takes a single input 206 and can therefore not modulate the amplitude and phase of an optical signal independently. This modulator 206 may be an electroabsorption modulator with a single electrical input. The modulator 206 may be monolithically integrated on the same substrate as the optical source. The information to be transmitted is coupled to a different electrical pre-distortion unit 210 comprising two paths to generate the I 214a and Q 214b signal components of the pre-distorted signal. The two paths each comprise an electrical filter 211a and 211b, which may be digital filters, a serial to parallel converter 212a and 212b and a digital to analogue converter 213a and 213b. The electrical filters 211a and 211b respectively take as inputs the I and Q components of the required pre-distortion transfer function. The I and Q signals 214a and 214b, are coupled to an upconverter unit 200. The upconverter 200 takes the I signal 214a and an RF signal 204 to produce a signal 205a which is the composite modulated signal of 214a on the RF carrier 204. This signal 205a is similar to 214a, but shifted in frequency by RF carrier 204. Such an element can be achieved by a multiplying function or by some other nonlinear element such as a mixer. Similarly, the Q signal 214b is upconverted to signal 205b using upconverter 201b. However, the RF signal input to 201b is the RF signal 204 modified in phase by 202, such that the phase of the RF signal applied to 201b is approximately 90 degrees out of phase compared to the RF signal applied to 201a. The two signals 205a and 205b are combined using a conventional combiner 203 to produce a single output 206.

Figure 3:
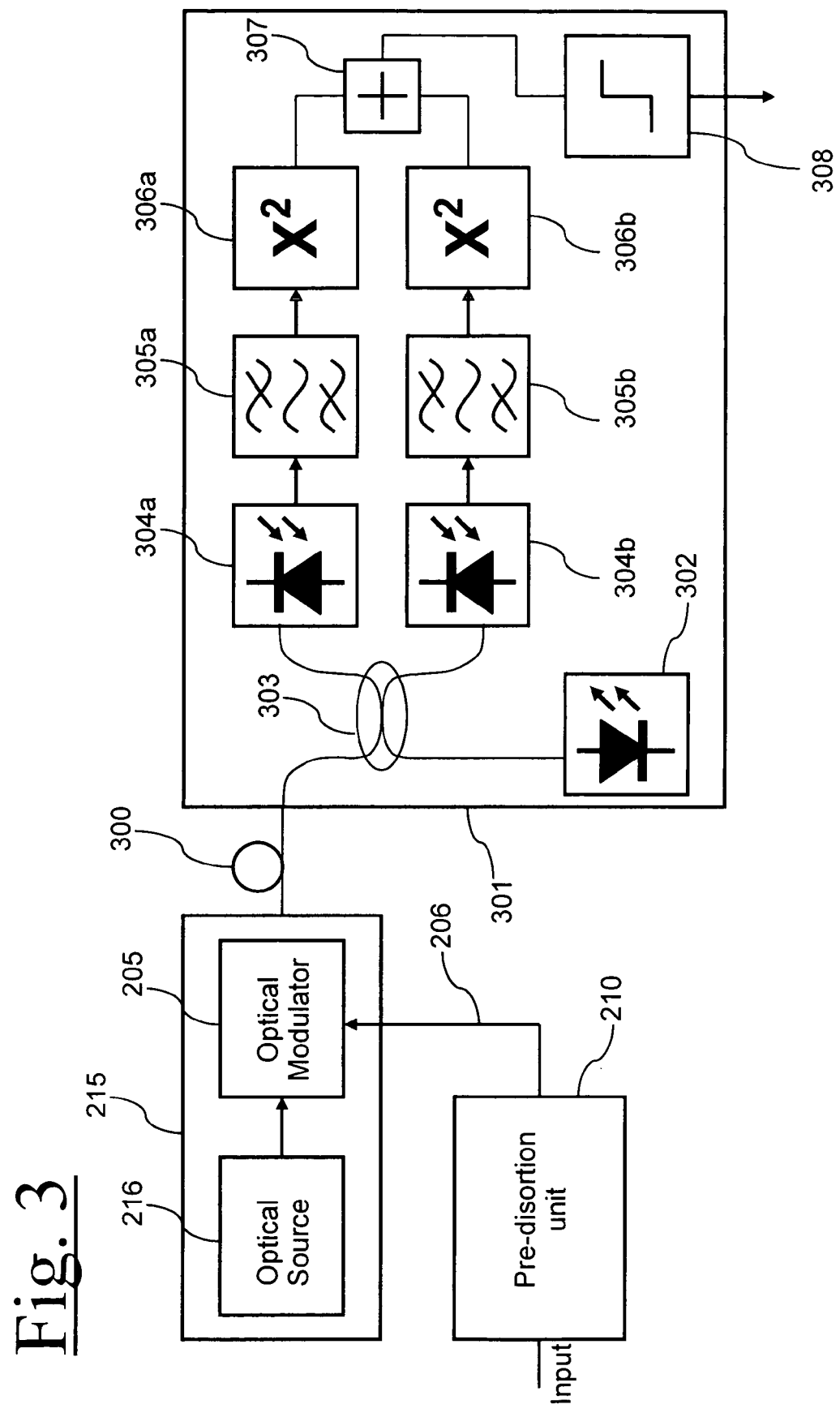
FIG. 3 shows a block diagram schematically illustrating the principle components and operations of a system for compensating for optical impairments electrically in accordance with a first embodiment of the present invention.

FIG. 3 shows the first embodiment of the present invention in an optical system with an optical receiver. There is an optical pre-distortion unit 210 coupled to an optical transmitter 215 including optical modulator 205. The optical system is coupled to the optical link 300 which may comprise of optical fibre, optical amplifiers and other optical components. The optical link in coupled to a coherent receiver 301. The coherent receiver 301 comprises an optical source 302 which may be wavelength tunable and may be shared with another unit such as an optical transmitter for the opposite direction. The signal from the optical source 302 is combined with the signal from the link 300 with an optical coupler 303. The optical coupler 303 combines its input signals in a polarisation diverse form such that it generates two output signals with a different polarisation relationship between the input signals. The difference in this polarisation relationship between the output ports is approximately orthogonal, such that there is always a combined beat signal at one or other of the ports. Such a coupler can be implemented with a conventional coupler followed by a polarisation beam splitter, with the polarisation angle of the optical source 302 aligned such that there is approximately equal source power from 302 delivered to each arm of the beam splitter. The two outputs from the optical coupler 303 are detected independently with an optical detector 304a and 304b, an electrical filter 305a and 305b an electrical envelope detector 306a and 306b and subsequently combined with 305 and threshold detected into an digital signal with 308. The coherent optical receiver is similar to a conventional coherent optical receiver except that the filtering means 305a and 305b has a different characteristic as will be later apparent. The envelope detector may be implemented as a squaring function, which itself may be realised as a mixer with the two inputs matched in phase and amplitude response and communed together.

Figure 4:
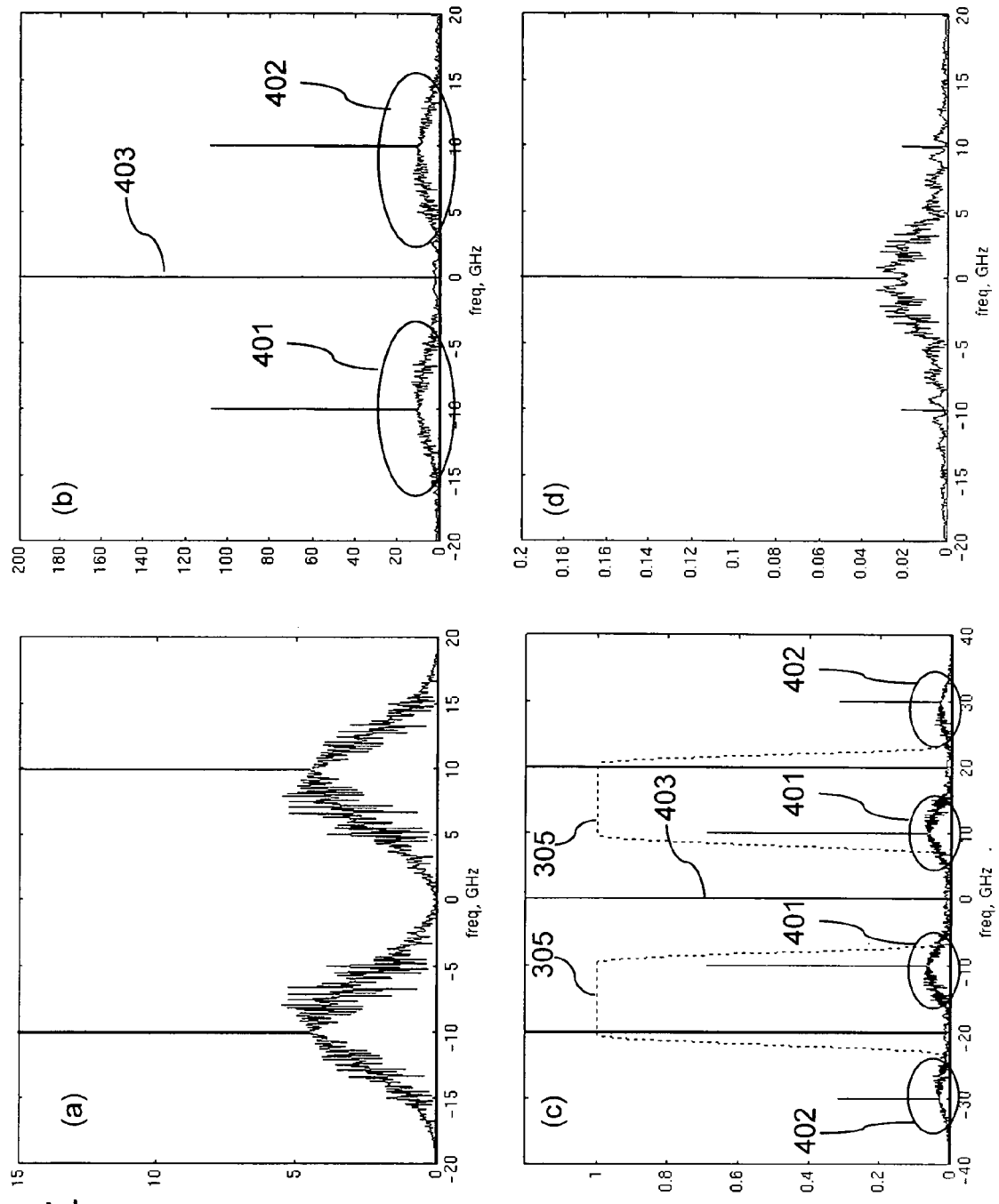
FIG. 4 shows example spectra at various points in the system of FIG. 3 in accordance with a first embodiment of the present invention.

FIG. 4 shows example spectra at various points in the system for the first embodiment. FIG. 4a shows the spectra of the electrical signal 206 from the pre-distortion unit 210. This assumes a bit rate of 10 Gbit/s, an RF signal 204 of 10 GHz and an electrical bandwidth for the optical modulator 205 of 10 GHz. Here it can be seen that the modulated data has been upconverted onto a 10 GHz carrier. The electrical spectrum is shown in the conventional way with both positive and negative frequencies, though negative frequencies are not observable.

FIG. 4b shows the optical signal emerging from the optical transmitter 215. Here it may be seen that there is a central carrier and the frequency scale is now relative to this carrier (so both positive and negative frequencies on this scale are observable). In addition to the carrier, there are two optical sidebands 401 and 402 each containing the data spectrum. In general only one of these sidebands will have the correct pre-distortion signal for the optical system and the other will be the complex conjugate. Which is which depends on whether there is phase lead or phase lag introduced by 202.

FIG. 4c shows the electrical spectrum emerging from the optical detectors 304a and 304b assuming they have a 20 GHz bandwidth (again only positive frequencies are observable). Now both sidebands 401 and 402 lie at positive frequencies and so are observable. However, due to the frequency roll-off of the optical detectors 304a and 304b, the higher frequency sideband 402 is attenuated relative to the lower frequency sideband 401. Superimposed onto FIG. 4c is an example filter characteristic for filtering means 305a and 305b. In a conventional coherent receiver the filtering means 305a and 305b would only have the function of high pass filtering the signal to remove the unwanted components below 10 GHz which are direct detected (i.e. present even in the absence of any signal from 302). In the present invention, the filtering means 305a and 305b has the additional function of suppressing the unwanted sideband. In this example, the phase of 202 has been selected such that the lower sideband 401 contains the correct pre-distorted signal. The filtering means 305a and 305b therefore has a characteristic such as to substantially remove the upper sideband 402. In this example the filter function has been designed such that it only selects the upper portion of sideband 401. This has the advantage that the RF frequency from 204 can be of lower frequency as only one half of sideband 402 is required to recover the original signal.

FIG. 4d shows the signal after it has been envelope detected with 306a and 306b. This signal is now ideally nominally the same as the original signal, although any nonideality in the performance of the components may cause this to deviate.

Figure 5:
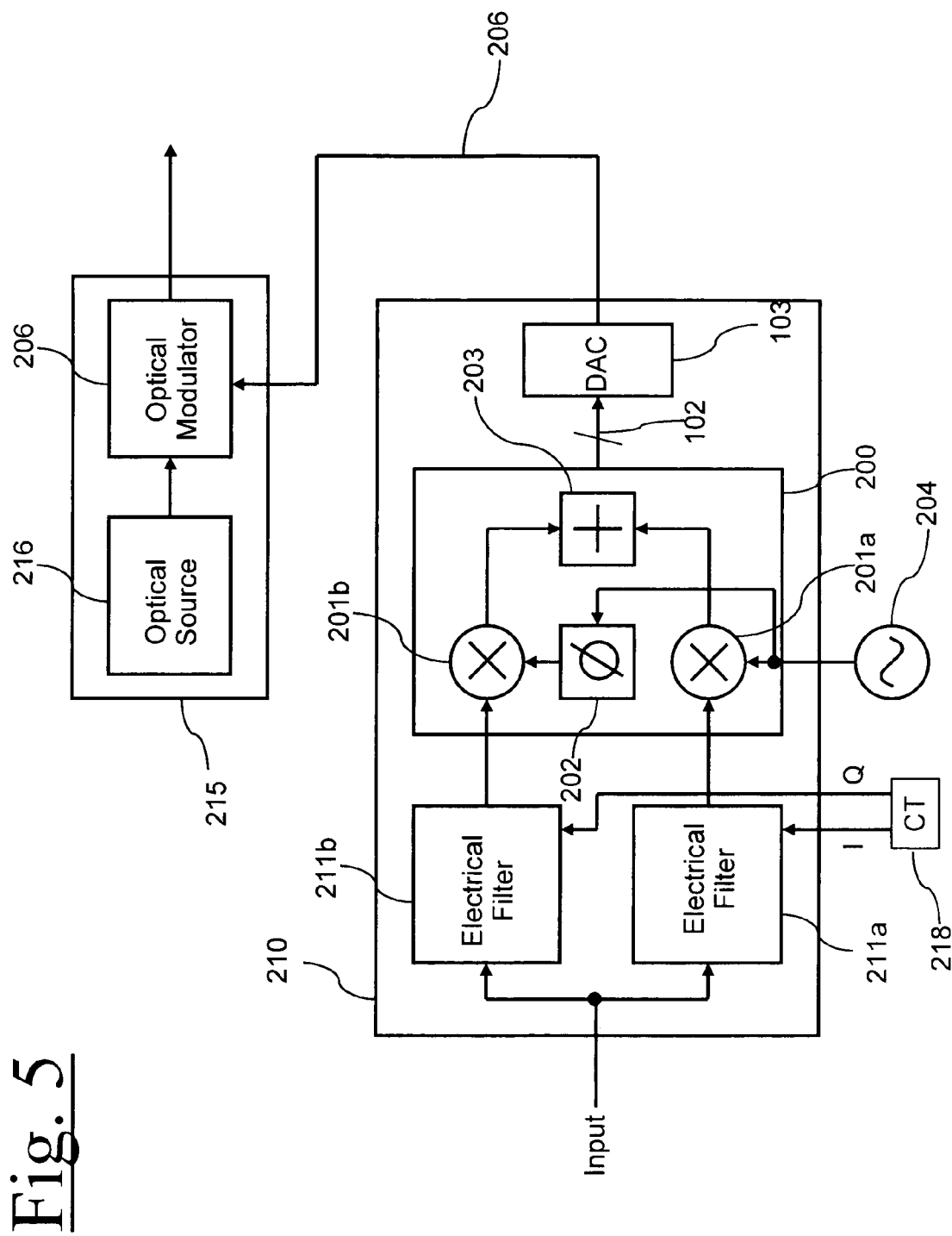
FIG. 5 shows a block diagram schematically illustrating the principle components and operations of a modified device for compensating for optical impairments electrically in accordance with a second embodiment of the present invention.

FIG. 5 shows a second embodiment of the present invention in which there is an optical transmitter 215 and an optical pre-distortion unit 210. Here there are two paths and two electrical filters 211a and 211b, taking additional inputs from the I and Q components of the pre-distortion transfer function respectively. In this embodiment, these digital signals are directly fed into the upconverter unit 200, which is now implemented in a digital form. The output from the upconverter unit is then a single digital signal which is coupled to a serial to parallel converter 212 and a digital to analogue converter 213. This configuration has the advantage that more of the processing is performed digitally for greater fidelity and only a single digital to analogue converter is required. However this digital to analogue converter must have a wider bandwidth.

Figure 6:
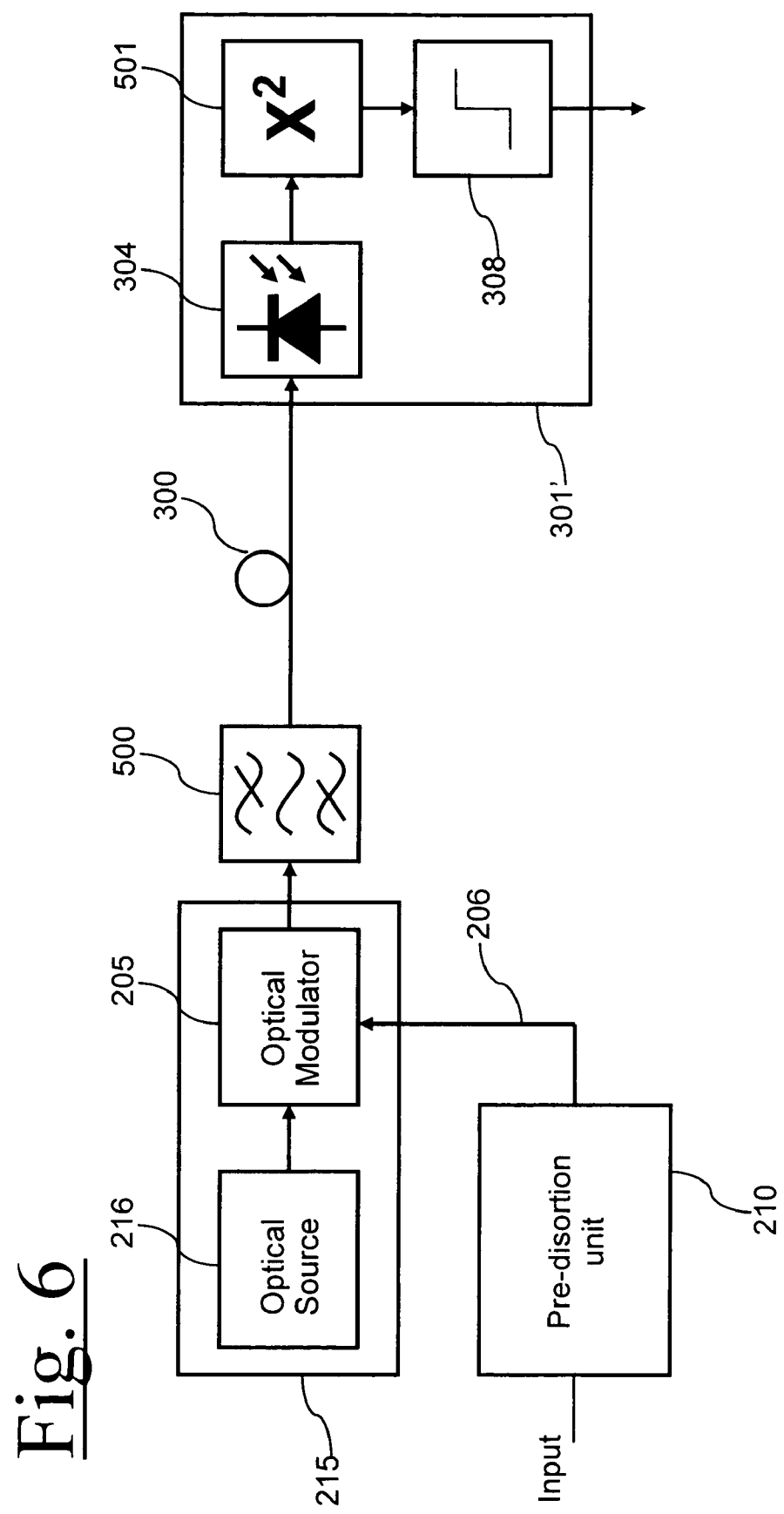
FIG. 6 shows a block diagram schematically illustrating the principle components and operations of a system for compensating for optical impairments electrically in accordance with a third embodiment of the present invention.

FIG. 6 shows a third embodiment in which a direct detection receiver is used instead of a coherent receiver. Here there is also an optical transmitter 215, a pre-distortion unit 210 an optical link 300 and a receiver 301. However in this instance instead of removing the unwanted sideband 401 by an electrical filtering means, an optical filtering means is used 500. This filter may positioned anywhere within the optical part of the system, e.g. before, after or within the optical link 300. The optical filtering means may be positioned within the optical transmitter 215 and may also be combined within an optical element used for establishing the wavelength of the optical source. Typically a laser package would incorporate an optical filter on the rear facet for monitoring its wavelength. By moving this element to the front facet, the element would perform the dual functions of wavelength monitoring and unwanted sideband removal. The optical filter 500 may instead be incorporated within the receiver. The advantage of placing this element at the receiver is that it has the desirable effect of reducing optical noise occurring from the optical amplifiers. The receiver itself comprises an optical detector 304, optionally a squaring element 501 and a threshold detector 308.

Figure 7:
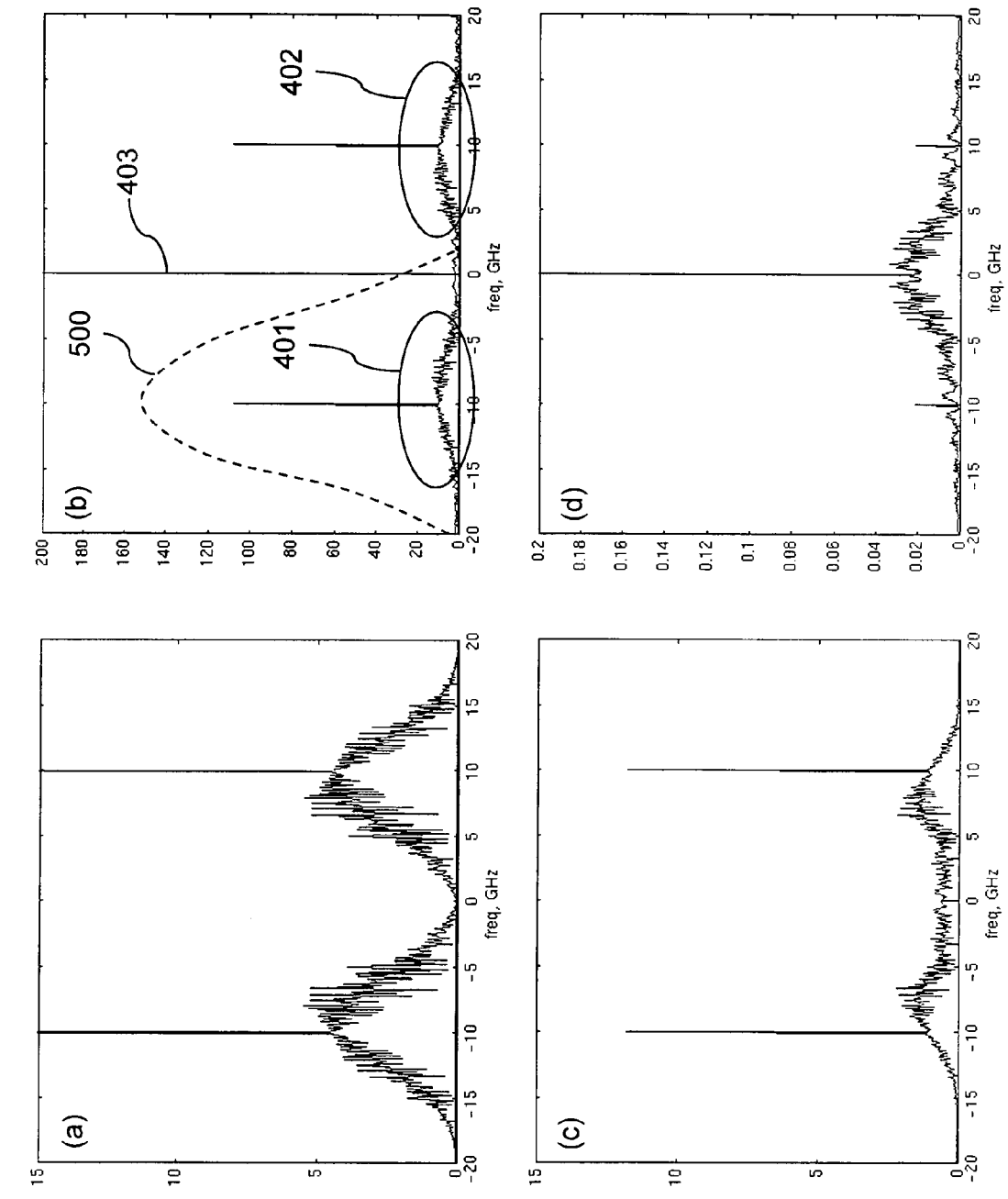
FIG. 7 shows example spectra at various points in the system of FIG. 6 in accordance with a third embodiment of the present invention.

FIG. 7 shoes example spectra at various points in the system for the third embodiment. FIG. 7a shows the electrical spectra applied to the optical transmitter 215. FIG. 7b shows the optical spectra emerging from the optical transmitter 215. Also shown in FIG. 7b is the characteristic of the filtering means 500, used to select the wanted sideband 401 and attenuate the unwanted sideband 402. In this example, a low-cost filter with a relatively broad cut-off has been used, such that a significant proportion of the carrier 403 will also pass through. FIG. 7c shows the electrical spectrum after the optical detector 304. Because a reasonable proportion of the carrier signal 403 is present, there is a beating of this carrier with the wanted sideband 401, which results in the baseband signal being upconverted to the frequency offset of the carrier (10 GHz in this example). As a result an envelope detection element 501 is used to downconvert this signal to the baseband. The final demodulated signal is shown in FIG. 7d.

Figure 8:
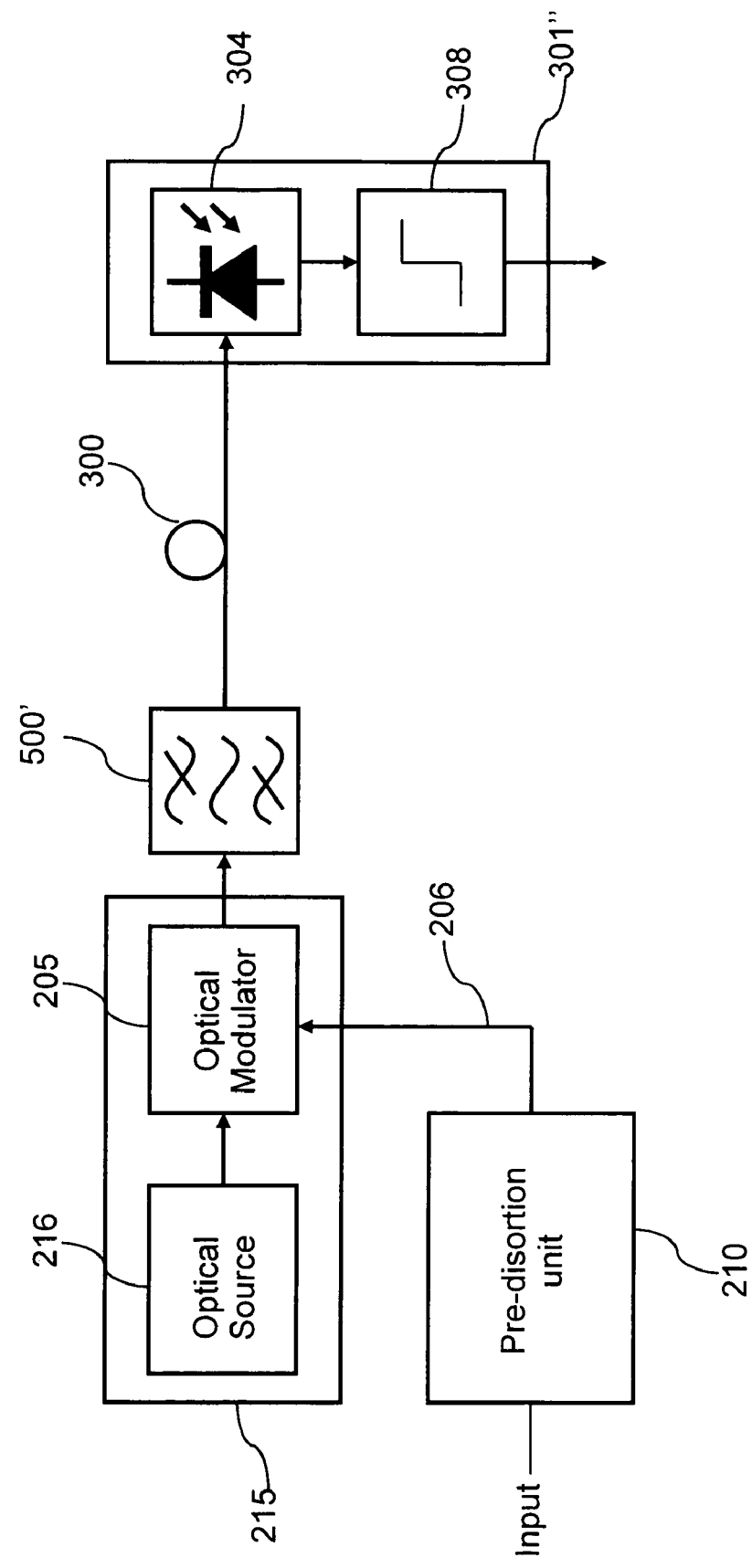
FIG. 8 shows a block diagram schematically illustrating the principle components and operations of a system for compensating for optical impairments electrically in accordance with a fourth embodiment of the present invention.

FIG. 8 shows a fourth embodiment in which a sharper roll-off filtering means 500 is used. Here there is an optical transmitter 215, a pre-disortion unit 210, an optical link 300 and a receiver 301. Here the roll-off of the filtering means is sharp enough so that both the optical carrier 403 and the unwanted sideband are substantially eliminated, such that the squaring element may be omitted.

Figure 9:
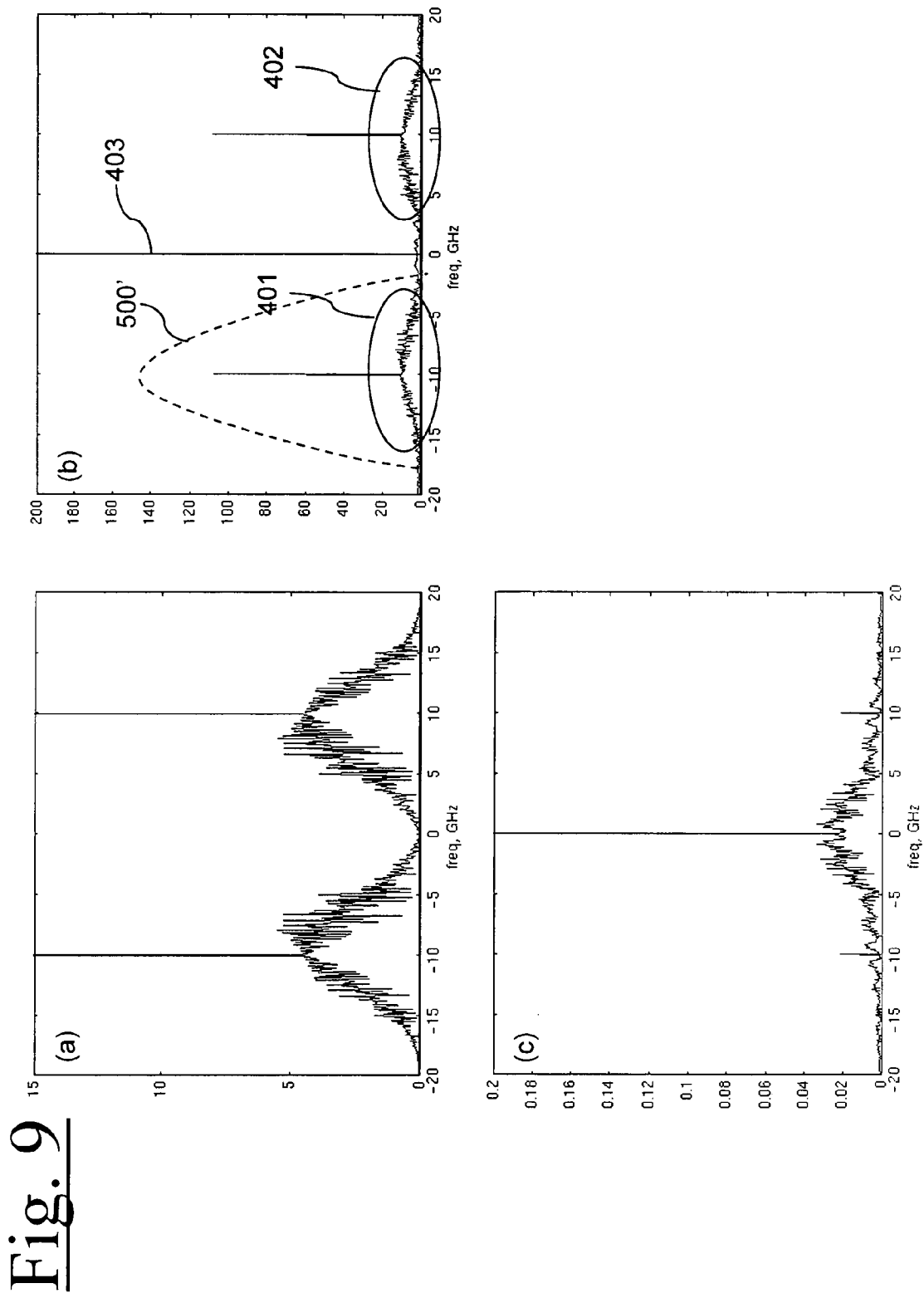
FIG. 9 shows example spectra at various points in the system of FIG. 8 in accordance with a fourth embodiment of the present invention.

FIG. 9 shows example spectra at various points in the system for the fourth embodiment. FIG. 9a is the electrical spectra from the pre-distortion unit 210. FIG. 9b is the optical sprectra emerging from the optical transmitter 215. Superimposed on FIG. 9a is the characteristic of filtering means 500. Here the roll-off is sharp to substantially reduce the carrier 403 in addition to the unwanted sideband 402. FIG. 9c shows the electrical signal after the optical detector 304. This signal has been demodulated to baseband.

FIG. 10 shows a fifth embodiment in which a differential phase shift keyed (DPSK) modulation format is used. There is an encoding unit 1007 for differentially encoding the data to be transmitted, a pre-distortion unit 210, an optical transmitter 215 a filtering means 500 an optical link 300 and a DPSK receiver 301. The DPSK receiver 301 comprises a DPSK demodulator 1000, an optical detector 1004, a threshold detector 1005 and a decoding unit 1006. The DPSK demodulator 1000 comprises a Mach-Zehnder interferometer (MZI) formed between two optical 1002 and 1003. The MZI is constructed such that there is a path difference between the arms 1001 of approximate equivalent length to the bit period in the data. The optical detector 1004 may comprise of a balanced receiver, or a pair of receivers or a single receiver. The DPSK receiver has the advantage of increased sensitivity and therefore increased performance compared to a direct detection receiver. At least part of the filtering means may be performed in the MZI. In particular, by appropriate phase adjustment between the arms it is possible to substantially null the carrier component, thereby reducing the amount of filtering required by other components. It is also possible to integrate the filter and the MZI together, which may be in the form of an integrated planar circuit. The DPSK receiver may also be implemented using a local oscillator laser, an electrical MZI and an electrical filtering means.

There are many variations of modular known to those skilled in the art that may be used within the optical transmitter. These include, but are not limited to Mach-Zehnder modulators, directional coupler modulators and electroabsorption modulators. Additionally, it is possible to modulate the optical source itself directly. In the case of a semiconductor laser this achieved by modulating the current drive to the laser, and is known as a directly modulated laser.

There are many variations of receiver known to those skilled in the art that may also include a filtering means for removing the unwanted sideband 402. These include but are not limited to direct detection receivers, heterodyne receivers, homodyne receivers, intradyne receivers and may use a variety of modulation formats including but not limited to amplitude modulation, phase modulation, multisymbol coding schemes such as QPSK and QAM.

In addition to dispersion, there are many other impairments which may be compensated, including but not limited to fibre nonlinearity (e.g. self phase modulation) and modulator chirp. Chirp is where the modulator may have the characteristic of modulating both amplitude and phase simultaneously but not independently. In such circumstances chirp can have the effect of causing a distortion to the transmitted waveform.

As well as compensating for a single channel, it is possible to transmit multiple channels by having a number of digital filters and upconverters within the pre-distortion unit, each having different carrier frequencies. These signals can then all be combined together to form a single electrical signal comprising many carriers. This electrical signal can then be applied to an optical modulator to allow multiple channels to be transmitted using a single modulator.

The invention claimed is:

1. A pre-distortion unit for compensating optical transmission impairments of an optical signal conveyed through an optical communications system, the unit comprising:
   at least one electrical filter arranged to modify an electrical input signal according to a pre-distortion function to generate a pre-distorted electrical signal which mitigates the impairments in an optical system; and
   at least one upconverter coupled to receive an electrical carrier signal and arranged to modulate the electrical carrier signal with the pre-distorted electrical signal to output an upconverted pre-distorted electrical signal for modulation of an optical signal to generate a corresponding pre-distorted optical signal.

2. A pre-distortion unit as claimed in claim 1, wherein the electrical filter is a digital filter.

3. A transmitter unit comprising a pre-distortion unit as claimed in claim 2, wherein there is additionally an optical transmitter for generating an optical signal and modulating said optical signal, using the upconverted pre-distorted electrical signal.

4. A transmitter unit as claimed in claim 3, wherein the optical transmitter unit comprises an optical filter.

5. A transmitter unit as claimed in claim 3, wherein the optical transmitter is a directly modulated laser.

6. A transmitter unit as claimed in claim 3, wherein the optical transmitter comprises an optical source and an optical modulator whose output has an instantaneous amplitude and phase that are not independently controllable at the modulation data rate.

7. A transmitter unit as claimed in claim 3, wherein the optical transmitter comprises an electro absorption modulator.

8. A transmitter unit as claimed in claim 3, wherein the optical transmitter comprises an optical source and an optical modulator which are integrated on a single substrate.

9. A transmitter unit as claimed in claim 1, wherein there are a plurality of electrical filters and a plurality of upconverters, each with different carrier frequencies and combined to form a composite signal.

10. A system for compensating for optical transmission impairments on an optical signal conveyed through an optical communicators system, the system comprising;
    at least one electrical filter arranged to modify an electrical input signal according to a pre-distortion function to generate a pre-distorted electrical signal which mitigates the impairments in an optical system; and
    at least one upconverter coupled to receive an electrical carrier signal and arranged to modulate the electrical carrier signal with the pre-distorted electrical signal; and
    an optical transmitter for generating an optical signal and modulating said optical signal, using the upconverted pre-distorted electrical signal; and
    an optical receiver for converting the optical signal into an electrical signal.

11. A system as claimed in claim 10, wherein the electrical filter s a digital filter.

12. A system as claimed in claim 11, wherein there is an electrical or optical filter for removing the information content present n optical sideband.

13. A system as claimed in claim 11, wherein the optical transmitter comprises an optical source and an optical modulator whose output has an instantaneous amplitude and phase that are not independently controllable at the modulation data rate.

14. A system as claimed in claim 11, wherein the optical transmitter is a directly modulated laser.

15. A system as claimed in claim 11, wherein the receiver comprises a local oscillator optical source for coherently interfering with the received signal.

16. A system as claimed in claim 11, wherein the receiver comprises a downconverting element to recover the original signal.

17. A system as claimed in claim 11, wherein the receiver has an interferometer for decoding a differential phase modulation format.

18. A system as claimed in claim 10, wherein the optical transmitter comprises an electro absorption modulator.

19. A system as claimed in claim 10, wherein the optical transmitter comprises an optical source and an optical modulator which are integrated on a single substrate.

20. A method of compensating optical impairments of an optical signal conveyed through an optical communications system, the method comprising the steps of:
    filtering an electrical input signal according to a pre-distortion function to generate a pre-distorted electrical signal which mitigates the impairments in an optical system; and
    modulating an RF carrier with a pre-distorted electrical signal to generate an upconverted pre-distorted electrical signal; and
    modulating an optical source using the upconverted pre-distorted electrical signal to generate a corresponding pre-distorted optical signal for transmission through the optical communications system.

21. A method as claimed in claim 20, wherein all or part of one optical sideband is removed by a filtering means.

22. A method as claimed in claim 21, wherein the filtering means is optical.

23. A method as claimed in claim 21, wherein the filtering is performed electrically within the receiver.

24. A method as claimed in claim 20, wherein the received electrical signal is downconverted or envelope detected.

25. A method as claimed in claim 20, wherein the impairment is dispersion.

26. A method as claimed in claim 20 wherein the impairment is fibre nonlinearity.

27. A method as claimed in claim 25 or claim 26, wherein additionally the impairment comprises modulator chirp.

* * * * *